United States Patent

Wetz

[11] Patent Number: 5,496,144
[45] Date of Patent: Mar. 5, 1996

[54] SELF-LOADING HAY BALE TRANSPORT TRAILERS

[76] Inventor: Monroe Wetz, 19597 FM 2252, San Antonio, Tex. 78266-2521

[21] Appl. No.: 317,940

[22] Filed: Oct. 4, 1994

[51] Int. Cl.$^6$ ............................................. A01D 90/00
[52] U.S. Cl. ..................... 414/24.5; 414/482; 414/555; 414/721
[58] Field of Search .................. 414/24.5, 24.6, 414/482, 483, 546, 555, 721; 188/23, 5

[56] References Cited

U.S. PATENT DOCUMENTS

| | | | |
|---|---|---|---|
| 3,938,682 | 2/1976 | Rowe | 214/353 |
| 3,944,905 | 3/1976 | Brown | 214/506 |
| 3,985,253 | 10/1976 | Kannady et al. | 414/24.5 |
| 4,089,425 | 5/1978 | Baltz | 214/1 HH |
| 4,930,964 | 6/1990 | Doan | 414/24.5 |
| 5,013,202 | 5/1991 | Love | 414/24.5 |
| 5,030,053 | 7/1991 | Wickizer | 414/483 |

*Primary Examiner*—William E. Terrell
*Assistant Examiner*—Douglas A. Hess
*Attorney, Agent, or Firm*—Nixon & Vanderhye

[57] ABSTRACT

Self-loading/unloading transport trailers include at least one rearwardly extending frame extension foot which is positioned below a rearward cross-brace of the cradle frame. During a loading/unloading operation, the rearwardly extending frame extension foot will engage the ground surface to cause the cradle member to pivot thereabout and physically lift the wheel assemblies out of ground-engagement. Continued pivotal movement of the cradle member about the ground-engaged frame extension foot will then allow the cross-brace to come into contact with the ground and will thereby cause the frame extension foot to become disengaged with, and the wheel assemblies to be further incrementally lifted above, the ground surface. A manually actuated mechanical brake assembly is provided in order to arrest rearward movement of the transport trailer during a loading/unloading operation and thereby allow the cradle frame to initially pivot about the journal axis of the wheel assemblies. A substantial component of the load weight supported within the cradle frame is transferred to the forward hitch frame according to the present invention by virtue of a pair of flexible limiting members (which may take the form of chain, wire cable, rope or the like), the rearward ends of which are connected to the cradle frame, with the forward ends connected to the hitch frame.

33 Claims, 10 Drawing Sheets

SELF-LOADING HAY BALE TRANSPORT TRAILERS

FIELD OF INVENTION

The present invention relates generally to the field of hay bale transport trailers, and particularly, trailers having self-loading/unloading capabilities so that the hay bale does not necessarily need to be manually lifted onto and from the trailer during such loading/unloading operations.

BACKGROUND OF THE INVENTION

Self-loading trailers for cylindrical hay bales and other large or bulky commodities are generally well known and have been used for many years. In this regard, U.S. Pat. Nos. 3,938,682 and 4,089,425 (the entire content of each such patent being incorporated expressly hereinto by reference) each disclose self-loading trailers which are believed to be representative of the state of this art.

As can be seen from these prior-issued U.S. Patents, the conventional hay bale transport trailer necessarily includes an electrical or hydraulic actuated braking system. The electrical or hydraulic braking system is provided so as to halt rearward movement of the trailer during a bale loading/unloading operation and thereby allow the trailer to articulate at the axle joining the forward trailer hitch frame and the rearward bale cradle frame. The electrical or hydraulic braking system of these prior art bale transport trailers therefore must be interconnected to the pulling vehicle's electrical or hydraulic systems, respectively, thereby adding costs to enable a vehicle to be retrofitted for purpose of pulling the hay bale transport trailer. Furthermore, the braking systems associated these prior art transport trailers are susceptible to wear over time thereby requiring additional maintenance costs for the trailer operator/owner.

It will also be appreciated by those in the art that the weight of the hay bale when located in the cradle frame exerts a substantial load on the articulation axle joining the cradle frame to the hitch frame of the trailer. Over time, therefore, conventional trailers may experience structural failure of the articulation. As an attempt to overcome this problem, the trailers disclosed in the above-cited '682 and '425 each employ a rigid load-bearing member. For example, as seen in the '682 patent, a rigid limiting strap is provided which joins the rearward cradle frame to the forward hitch frame. In the '425 patent, the cradle frame is provided with a cross-bar against which rearward leg sections of the hitch frame bear.

Although the prior art hay bale transport trailers are satisfactory for their intended purpose, some improvements are still desired. For example, it would especially be desirable if a hay bale transport trailer could be provided with a braking system that did not need to be operatively interconnected to the pulling vehicle's electrical and/or hydraulic systems. It would likewise be desirable if a simplified structure could be provided which transfers the load from the cradle frame to the hitch frame (i.e., so that the articulating axle does not bear the entire load of the transported hay bale). It is therefore towards obtaining these desirable attributes of hay bale transport trailers that the present invention is directed.

SUMMARY OF THE INVENTION

In general, the present invention is embodied in a hay bale transport trailer which does not necessarily need to be equipped with wheel brakes that must be coupled operatively to a vehicle's electrical and/or hydraulic systems. In this regard, the transport trailer of the present invention includes at least one rearwardly extending frame extension foot which is positioned below a rearward cross-brace of the cradle frame.

Therefore, during a loading/unloading operation, the rearwardly extending frame extension foot will engage the ground surface to cause the cradle member to pivot thereabout and physically lift the wheel assemblies out of ground-engagement. Continued pivotal movement of the cradle member about the ground-engaged frame extension foot will then allow the cross-brace to come into contact with the ground. Such ground engagement of the rearward cross-brace will thereby cause the frame extension foot to become disengaged with, and the wheel assemblies to be further incrementally lifted above, the ground surface.

A manually actuated mechanical brake assembly is provided in order to arrest rearward movement of the transport trailer during a loading/unloading operation and thereby allow the cradle frame to initially pivot about the journal axis of the wheel assemblies. In this regard, the preferred brake foot assembly according to the present invention includes separately pivotal actuator arm and ground-engageable brake foot assemblies.

The brake foot assembly is capable of being deployed into ground engagement when desired by the vehicle operator which thereby arrests rearward trailer movement and causes the cradle frame to pivot about the journal axis of the wheel assemblies. The actuator assembly is operatively interconnected to the brake foot assembly to responsively cause it to be pivotally moved from its deployed position and into its non-deployed position automatically near the end of the loading/unloading operation. Such automatic return of the brake foot assembly thereby allows the trailer to immediately begin rolling forwardly over ground surface at the completion of the loading/unloading operation without the need for manual reset.

A substantial component of the load weight supported within the cradle frame is transferred to the forward hitch frame according to the present invention by virtue of a pair of flexible limiting members (which may take the form of chain, wire cable, rope or the like). In this regard, the rearward ends of the flexible limiting members are connected to the cradle frame, while the forward ends are connected to the hitch frame. As such, the flexible limiting members are positioned below and thus span the articulating axle joining the hitch and cradle frames. The length of the flexible limiting members is chosen so that the members are pulled taut when the trailer is in its transporting condition.

Further aspects and advantages of this invention will become more clear after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
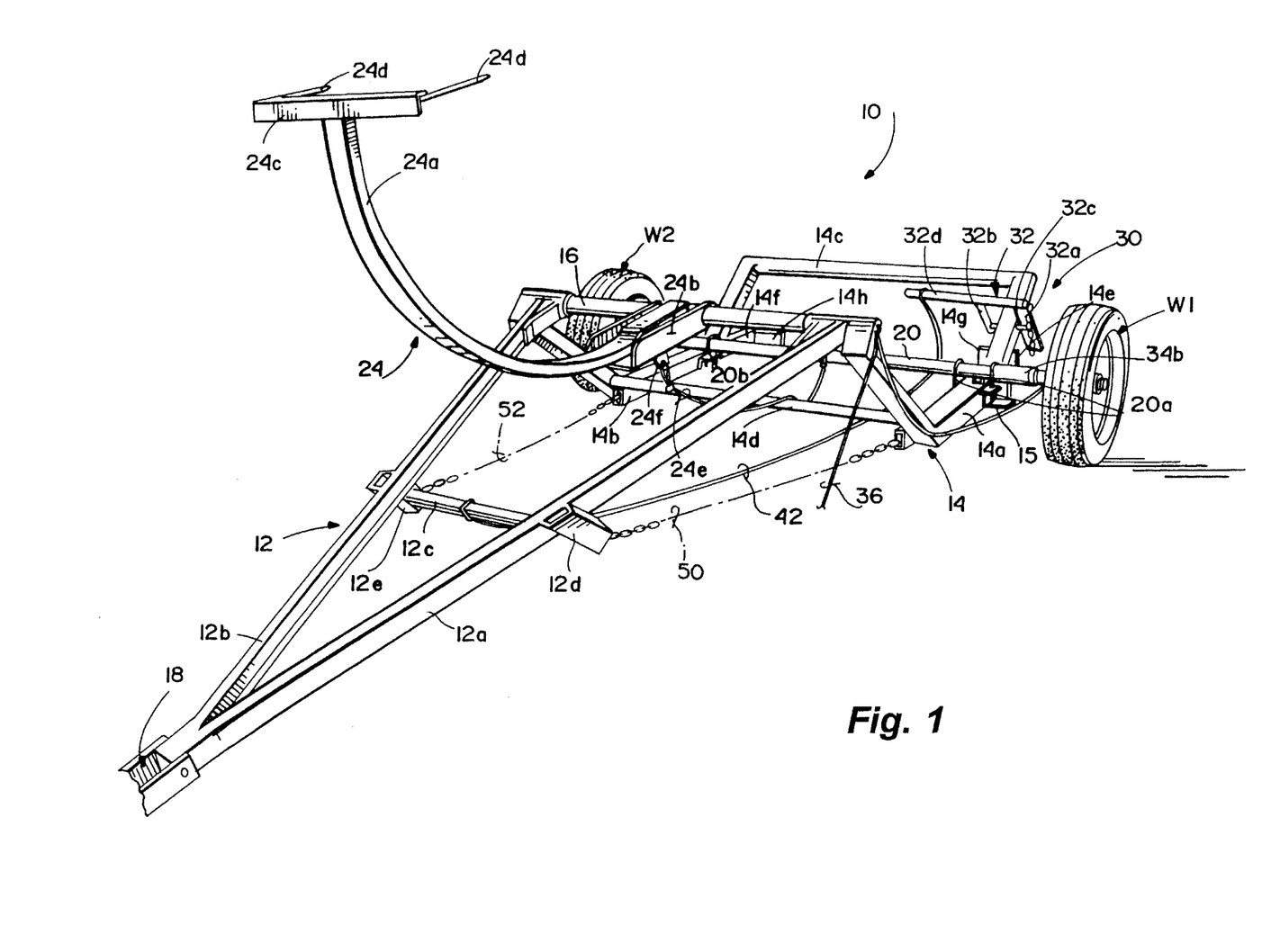
FIG. 1 is a front perspective view of the hay bale transport trailer embodying the improvements according to the present invention.

As can be seen from accompanying FIG. 1, the transport trailer 10 according to the present invention generally includes a forward trailer hitch frame 12 and a rearward cradle frame 14 joined to one another to allow for relative articulation by transverse articulation axle 16. The hitch frame 12 is generally comprised of a pair of lateral frame members 12a, 12b and a cross-support member 12c. The lateral frame members 12a, 12b converge toward one another from the articulation axle 16 and support at their forward ends a conventional trailer hitch 18 which allows the trailer 10 of this invention to be coupled to a pulling vehicle V (see FIGS. 2A–2F).

The cradle frame 14, on the other hand, is preferably comprised of generally arcuate-shaped side cradle members 14a, 14b which are rigidly separated laterally from one another by a rearward cross-brace 14c and the articulation axle 16. An intermediate cross-brace 14d rigidly connected to the side cradle members 14a, 14b may also be provided so as to increase the overall structural integrity of the cradle frame 14. The cradle frame 14 also includes a pair of frame extension feet 14e, 14f extending rearwardly of, and rigidly forming a part of, the side cradle member 14a, 14b, respectively. The frame extension feet 14e, 14f each include an inwardly turned flanges 14g, 14h which engage the ground during a hay bale loading/unloading operations as will be discussed in greater detail below.

The entire trailer 10 includes a pair of wheel assemblies W1, W2 connected at each end to a transverse rolling axle 20. The axle 20 is coupled to the cradle frame 14 by any conventional means which allows the wheel assemblies W1, W2 to be journally supported for rolling movement above ground surface. In this regard, in the embodiment shown, the axle 20 is itself journally connected to the side cradle members 14e, 14f, by means of U-bolts 20a, 20b, respectively.

A self-actuating fork assembly 24 is mounted for free pivotal movements to articulating axle 16 so as to assist in the loading of a hay bale onto the cradle frame 14 during a loading operation. The fork assembly 24 is generally comprised of an elongate curved fork arm 24a having a proximal end coupled rigidly to a support flange assembly 24b sleeved over a central portion of the articulation axle 16. The distal end of the fork arm 24a carries a transverse head bar 24c. Several tines 24d project outwardly from the head bar 24c so as to penetrate the hay bale when the fork assembly 24 pivots into engagement therewith during a loading operation.

The fork assembly 24 also includes a flexible actuator cable 24e (which may be in the form of wire, rope, chain or like flexible elements) having one end connected to the rolling axle 20 and the other end connected to a rigid lug 24f extending from the support flange assembly 24b. When the fork assembly 24 has pivotally moved rearwardly so as engage the hay bale during a loading operation, the slack in the actuator cable 24e will have been removed. Therefore, when the hay bale is loaded into the cradle frame 14, the weight of the cradled hay bale will forcibly cause the actuator cable 24e to pull on the lug 24f which, in turn, causes the fork assembly 24 to return to its rest position as shown in FIG. 1.

A mechanical brake assembly 30 is carried by the side cradle member 14a and is generally comprised of an actuator arm assembly 32 and a ground-engageable brake foot assembly 34. The deployment of the brake assembly 30 is controlled by the driver of the pulling vehicle V by means of a control cable 36. In this regard, it will be appreciated that, since the driver of the vehicle V will manually control deployment of the brake assembly 30, the brake assembly 30 is most preferably provided on the left-hand side of the trailer 10. However, mounting of the brake assembly 30 on the right-hand side of the trailer 10 is also within the scope of this invention, in which case, the control cable 36 is routed to the driver and/or is activated by a non-driving assistant located elsewhere in the vehicle V.

The actuator arm assembly 32 includes parallel pivot support arms 32a, 32b which straddle the side cradle member 14a and are joined thereto by a pivot pin 32c. A transverse actuator arm 32d is rigidly connected to the upper ends of each of the pivot support arms 32a, 32b. The actuator arm assembly 32 is biased into its raised position as shown in FIG. 1 by means of a tension spring 32e (not seen in FIG. 1, but seen FIGS. 3A–3F) which is operatively connected between the lower end of the support arm 32a and an attachment boss 32f rigidly forming a part of the side cradle member 14a.

The brake foot assembly 34 (most component structures of which are not seen in FIG. 1, but seen FIGS. 3A–3F) includes an elongate rigid brake foot 34a (which may be in the form of a beam, tube, pipe or like structural element) having its upper end rigidly connected to a sleeve member 34b. The sleeve member 34b is coaxially sleeved over the rolling axle 20 so as to be freely pivotal thereabout. The lower end of the brake foot assembly 34 most preferably includes a stabilizing flange 34c which assists in stabilizing the brake foot 34a and thus prevents it from penetrating too deeply into soft ground.

The brake foot assembly 30 is maintained in its non-deployed position as shown in FIG. 1 by a latch 38a which is pivotally connected to the brake foot 34a at one end, and to the control cable 36 at its opposite end. The latch 38a engages a pawl 38b which rigidly extends outwardly from the side cradle member 14a. When the driver of the vehicle (or other person) manually pulls on the control cable 36, the latch 38a will disengage from the pawl 38b thereby allowing the brake foot 34a to pivot under its own weight about the axle 20 by virtue of the sleeve member 34b into a deployed position wherein the terminal end of the brake foot 34a engages the ground.

The actuator arm assembly 32 and the brake foot assembly 34 are interconnected by a flexible linkage member 40. The flexible linkage member 40 in the preferred embodiment shown is a length of chain, but a length of wire or rope cabling and/or other mechanical linkages may be employed if desired. The actuator arm assembly 32 is further provided with a flexible arresting cable 42 which in the preferred embodiment shown is coupled between the actuator arm 32d and the cross-support member 12c of the hitch frame 12. The arresting cable 42 prevents the actuator arm assembly 32 from pivotally moving from its lowered position and into its raised position by the force of the tension spring 32e during a loading operation (i.e., when no load is being supported in the cradle frame 14) until the hitch frame 12 and cradle frame 14 have been articulated relative to one another. Thus, by maintaining the actuator arm assembly 32 in its lowered position, the arresting cable 42 allows the brake foot assembly to freely pivot into engagement with the ground.

The weight of the load supported within the cradle frame 14 is transferred to the forward hitch frame 12 by virtue of the flexible limiting members 50, 52. In this regard, the rearward ends of the flexible limiting members 50, 52 are connected to the cradle frame 14 near its intermediate cross-brace 14d, while the forward ends of the flexible limiting members 50, 52 are connected to the lateral connection lugs 12d, 12e of the cross-support member 12c associated with the hitch frame. As such, the flexible limiting members 50, 52 are positioned below and thus span the articulating axle 20. The length of the flexible limiting members 50, 52 is chosen so that the members 50, 52 are pulled taut when the trailer 10 is in its transporting condition as shown in FIG. 1. In such a condition, therefore, a substantial component of the weight of the load supported within the cradle frame 14 is transferred to the forward hitch frame 12 (and hence to the vehicle V) so that minimal load will be placed on the articulating axle 16 during transport. In addition to transferring the weight to the hitch assembly at the rear of vehicle V, the flexible limiting members 50, 52 absorb much of the gravitational shock as the load is returned to the trailer's transporting position.

Figure 2A:
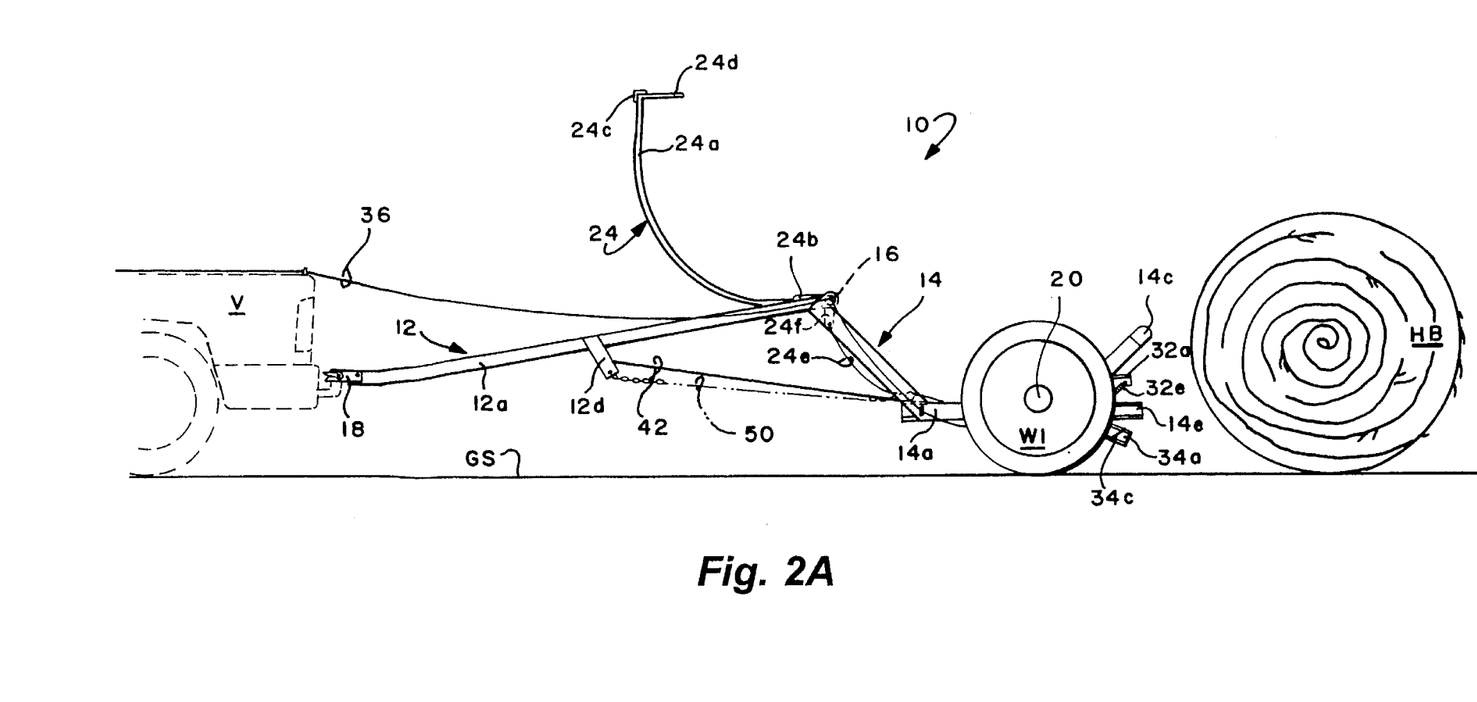
FIGS. 2A–2F are sequential side elevational views showing the hay bale transport tailer according to this invention during a hay bale pick-up operation.

The operation of the self-loading trailer 10 according to this invention will be described in greater detail with reference to FIGS. 2A–2F which represent an overall side elevational view of the trailer 10 during a hay bale loading procedure. Reference will also be made to FIGS. 3A–3F which depict in greater detail the functions of the brake foot assembly 30 in sequences corresponding to those depicted in FIGS. 2A–2F. In this regard, it will be noted in FIG. 2A that the vehicle V will be operated so as to back the trailer 10 towards a hay bale HB to be loaded. At this time, the actuator arm assembly 32 will be in the condition as shown in FIG. 2A That is, the actuator arm assembly 32 will be maintained in its lowered condition against the bias force of spring 32e by the arresting cable 42 being pulled taut when the trailer 10 is in a transport condition (i.e., when the hitch frame 12 and the cradle frame 14 are not articulated with respect to one another).

Figure 2B:
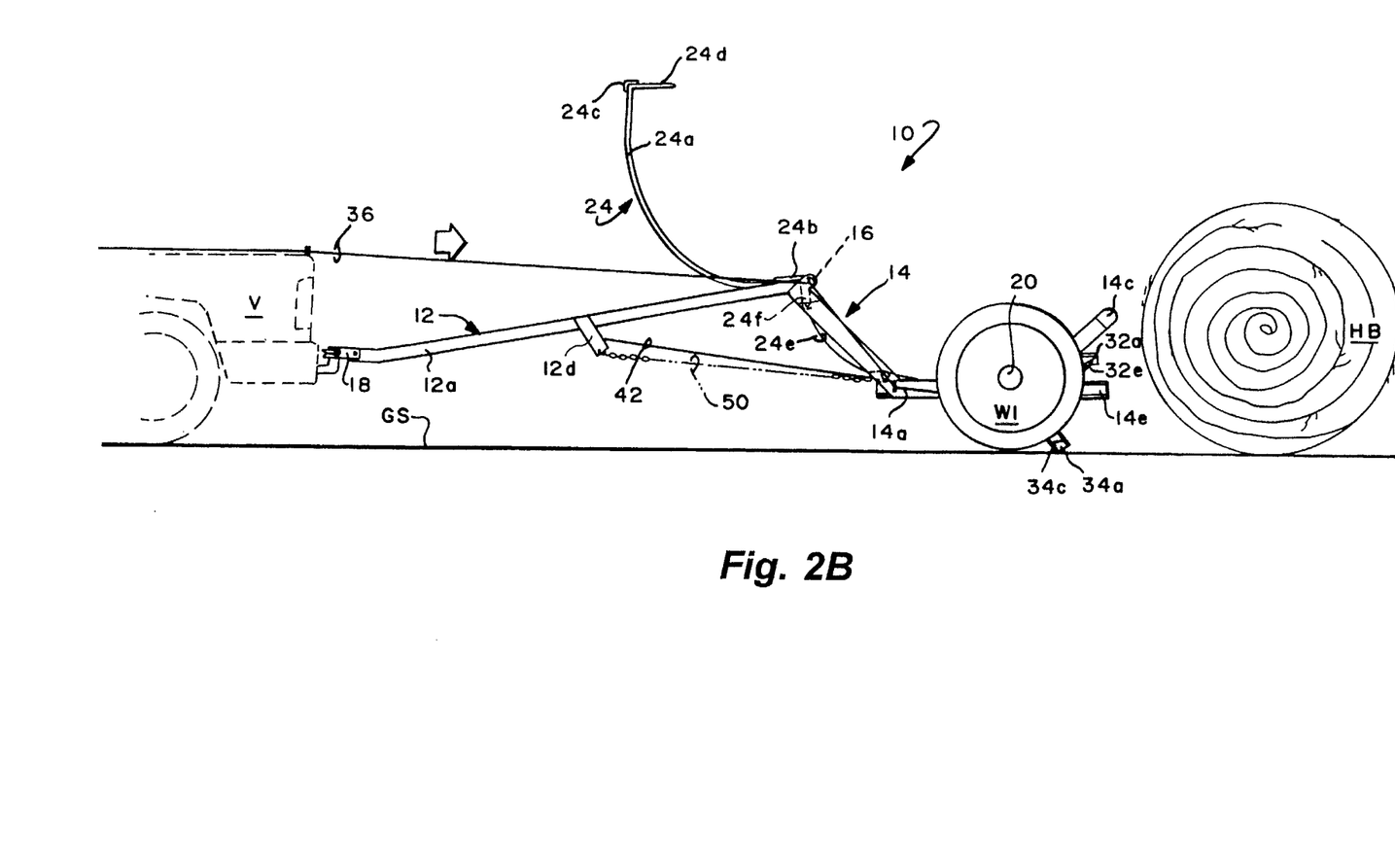
Figure 3A:
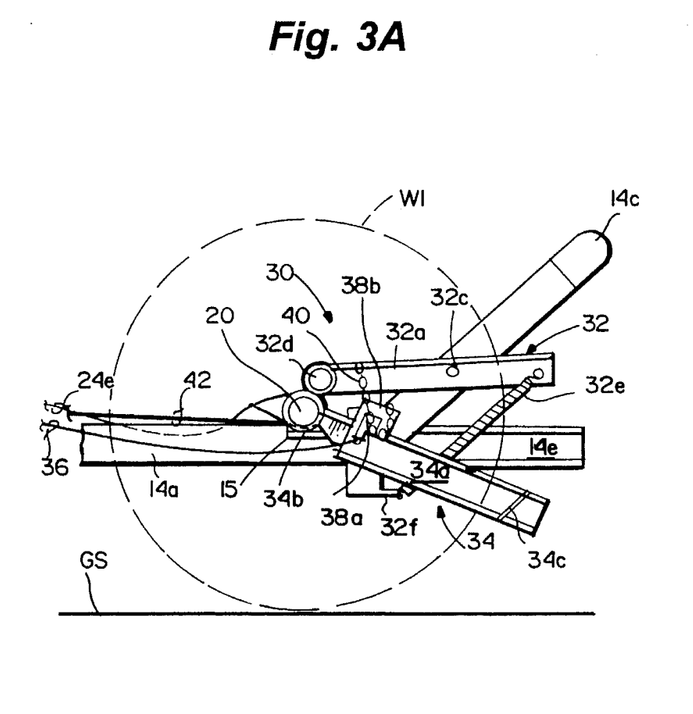
FIGS. 3A–3F are detailed side elevational views of the mechanical brake foot assembly according to the present invention during a hay bale pick-up operation which correspond to the sequences depicted in FIGS. 2A–2F, respectively.
Figure 3B:
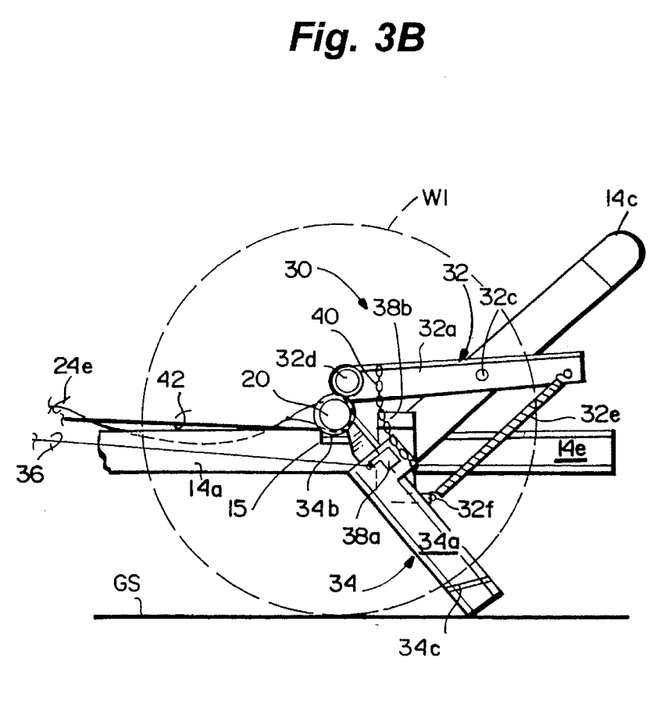

When the trailer 10 is in the proper position ahead of the hay bale HB, the driver (or other person) will manually pull on the control cable 36 thereby releasing the latch 38a from the pawl 38b and allowing the brake foot 34a of the brake foot assembly 34 to fall under its own weight into engagement with the ground surface GS as shown in FIGS. 2B and 3B. Coaxial pivotal movement of the brake foot 34a about the axle 20 is limited by a stationary stop member 15 (see FIG. 1). Upon engagement of the brake foot 34a with the ground surface GS, the rearward movement of the wheels W1 and W2 over the ground surface GS is halted.

Figure 2C:
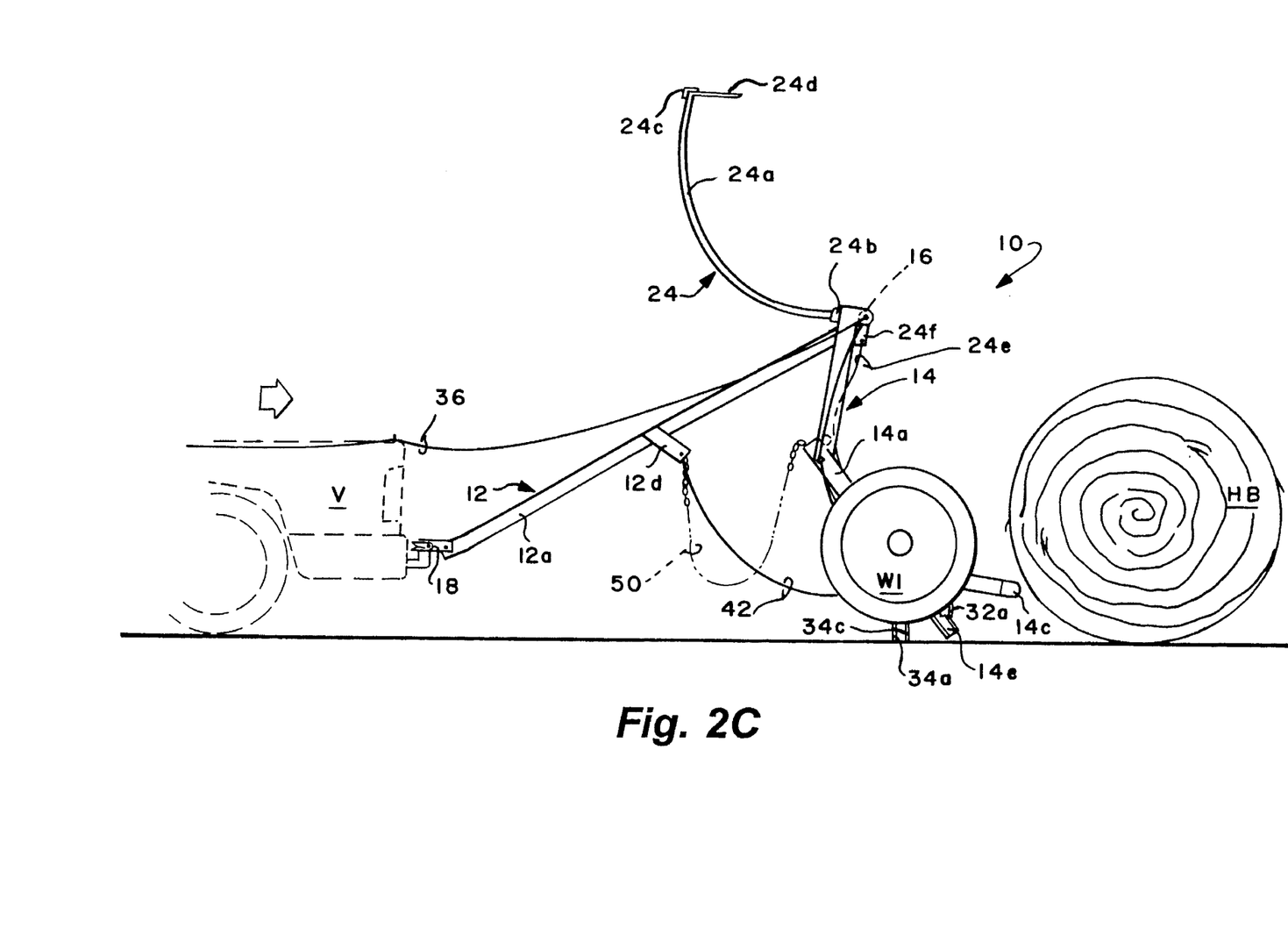
Figure 2D:
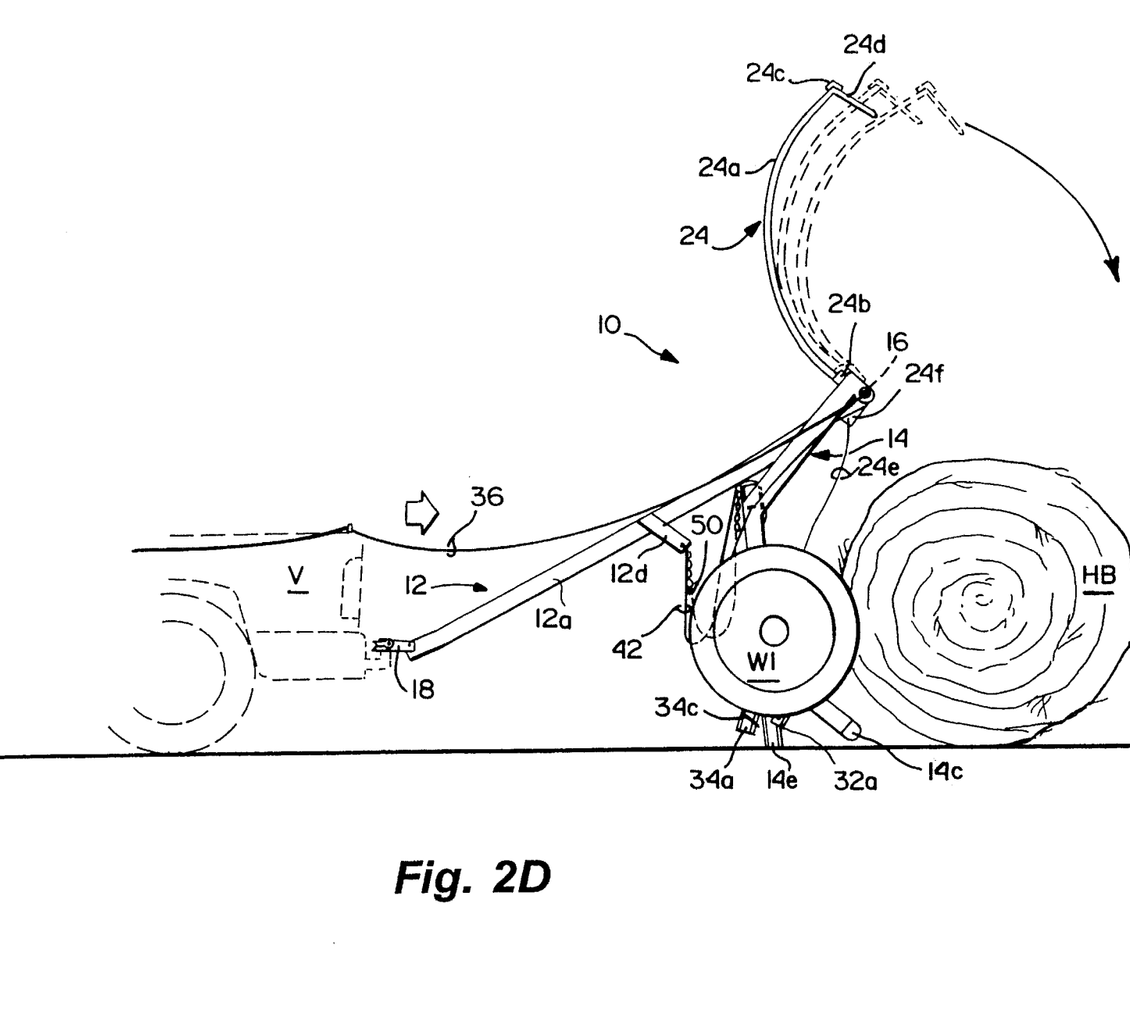
Figure 3C:
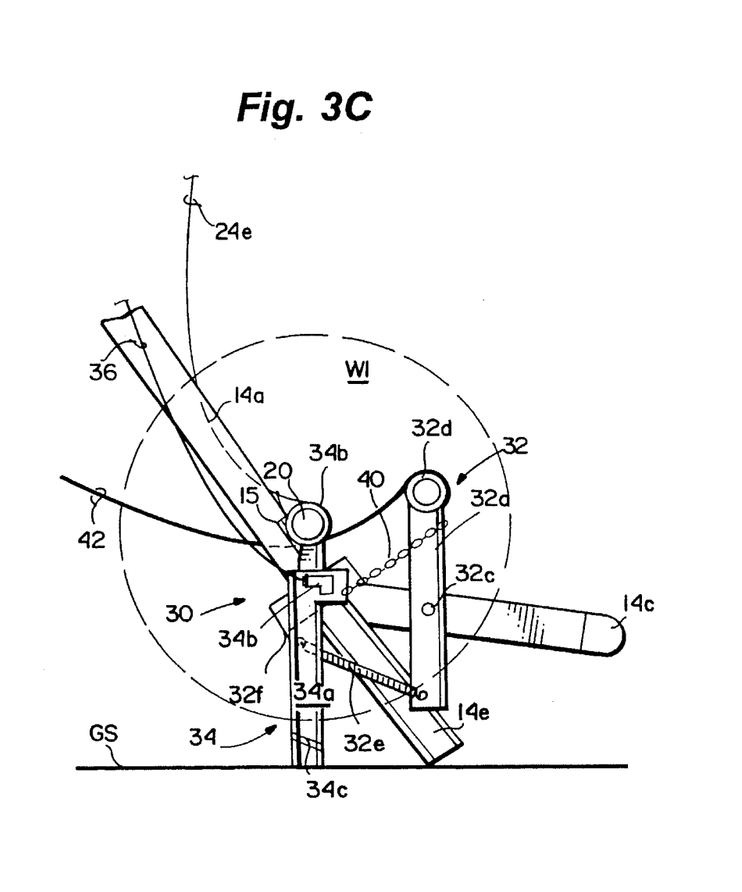
Figure 3D:
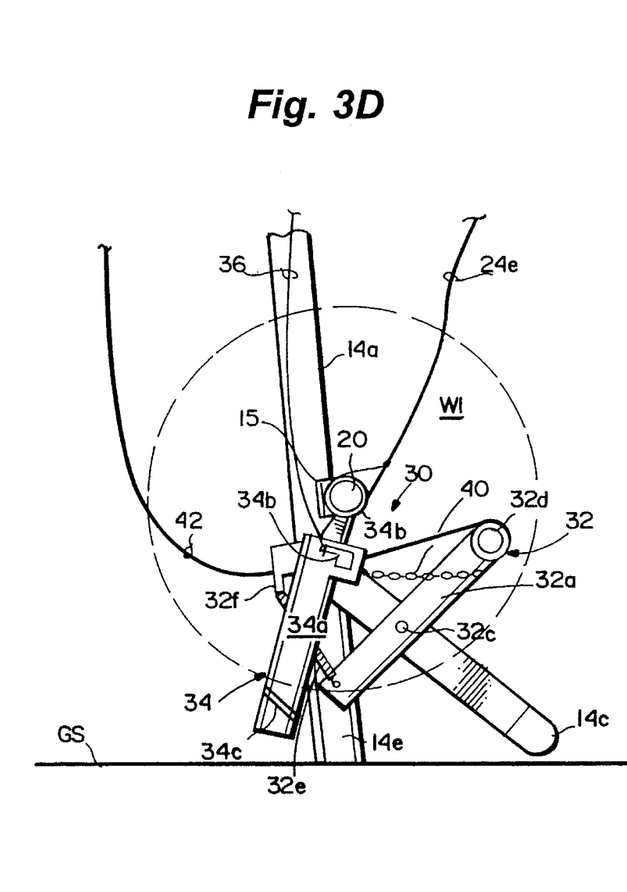
Figure 3E:
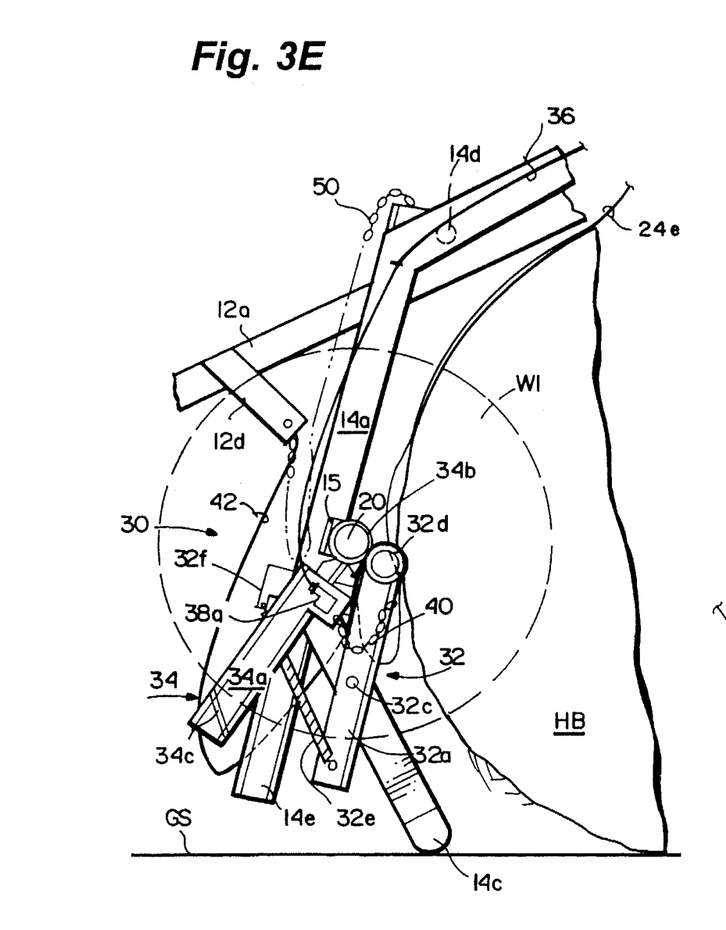

With engagement between the brake foot 34a and the ground surface GS established, continued rearward movement of the vehicle V will cause the hitch frame 12 and cradle frame 14 to articulate relative to one another about the articulation axle as shown in FIGS. 2C and 3C. The articulation between the hitch and cradle frames 12, 14, respectively, will thus cause the hitch frame 12 to relatively approach the cradle frame 14 and will be accompanied by pivotal movement of the cradle frame 14 about the journal axis of the wheel assemblies W1, W2 (i.e., about the rolling axle 20). It will be observed in FIG. 3c that, at this time, the arresting cable 42 will become slack thereby allowing the actuator arm assembly 32 to be pivoted about the pivot pin 32c toward its raised position by virtue of the bias force proved by the tension spring 32e. The actuator arm assembly 32, however, is limited in such pivotal movement by the length of the flexible linkage member 40. That is, the spring 39e will continue to exert a bias force to the actuator arm assembly 32, but full pivotal movement of the actuator arm assembly 32 is prevented by the linkage member 40 when the brake foot 34a of the brake foot assembly 34 is engaged with the ground surface GS.

Continued rearward movement of the vehicle V will cause the hitch frame 12 to further pivot the cradle frame 14 about the point of ground surface engagement of the brake foot 34a thereby resulting in a physical lifting of the wheel assemblies W1, W2 out of engagement with the ground surface GS (see FIGS. 2C and 3C). Shortly thereafter, the frame extension feet 14e, 14f become fully engaged with the ground surface GS (see FIGS. 2D and 3D). Since the frame extension feet 14e, 14f project rearwardly a greater dimension than the brake foot 34a of the brake foot assembly 34, the wheels W1 and W2 (and hence the rolling axle 20 to which they are journalled) will again be incrementally raised (i.e., by the difference in length between the brake foot 34a and the extension feet 14e, 14f) above the ground surface. This physical lifting of the wheel assemblies W1, W2 from the ground surface will in turn cause the terminal end of the brake foot 34a to become disengaged from the ground surface (see FIG. 3D). At this point in time, since the ground surface GS no longer restrains the brake foot 34a, the force of the spring 32a will then be sufficient to pivot the actuator arm assembly to its fully raised position which responsively causes the flexible linkage member 40 to carry the brake foot 34a upwardly until the latch 38a again. engages its pawl 38b. At this time, the brake foot assembly again assumes its non-deployed condition as shown specifically in FIGS. 2D and 3D.

During this stage, the fork assembly 24 is permitted to pivot under the force of gravity rearwardly into engagement with the hay bale HB since continued rearward movement of the vehicle V will position the head bar 24c over the center of its pivot axis about the articulating axle 16. Therefore, in the condition shown in FIG. 2E, the tines 24d of the fork assembly 24 will penetrate into the hay bale HB with the fork am 24a partially bounding the hay bale's rearward circumference. It will also be noted that engagement with the ground surface GS has been transferred to the rearward cross-brace 14c of the cradle frame. Since the rearward cross-brace 14c extends rearwardly by a dimension which is greater than the rearward extent of the frame extension feet 14e, 14f, the wheel assemblies W1, W2 will again be lifted above the ground surface GS by that incremental distance (i.e., since the cradle frame will pivot about the point of engagement between the cross-brace 14c and the ground surface GS). As a result, the frame extension feet 14e, 14f will be responsively be lifted out of engagement with the ground surface.

Figure 2E:
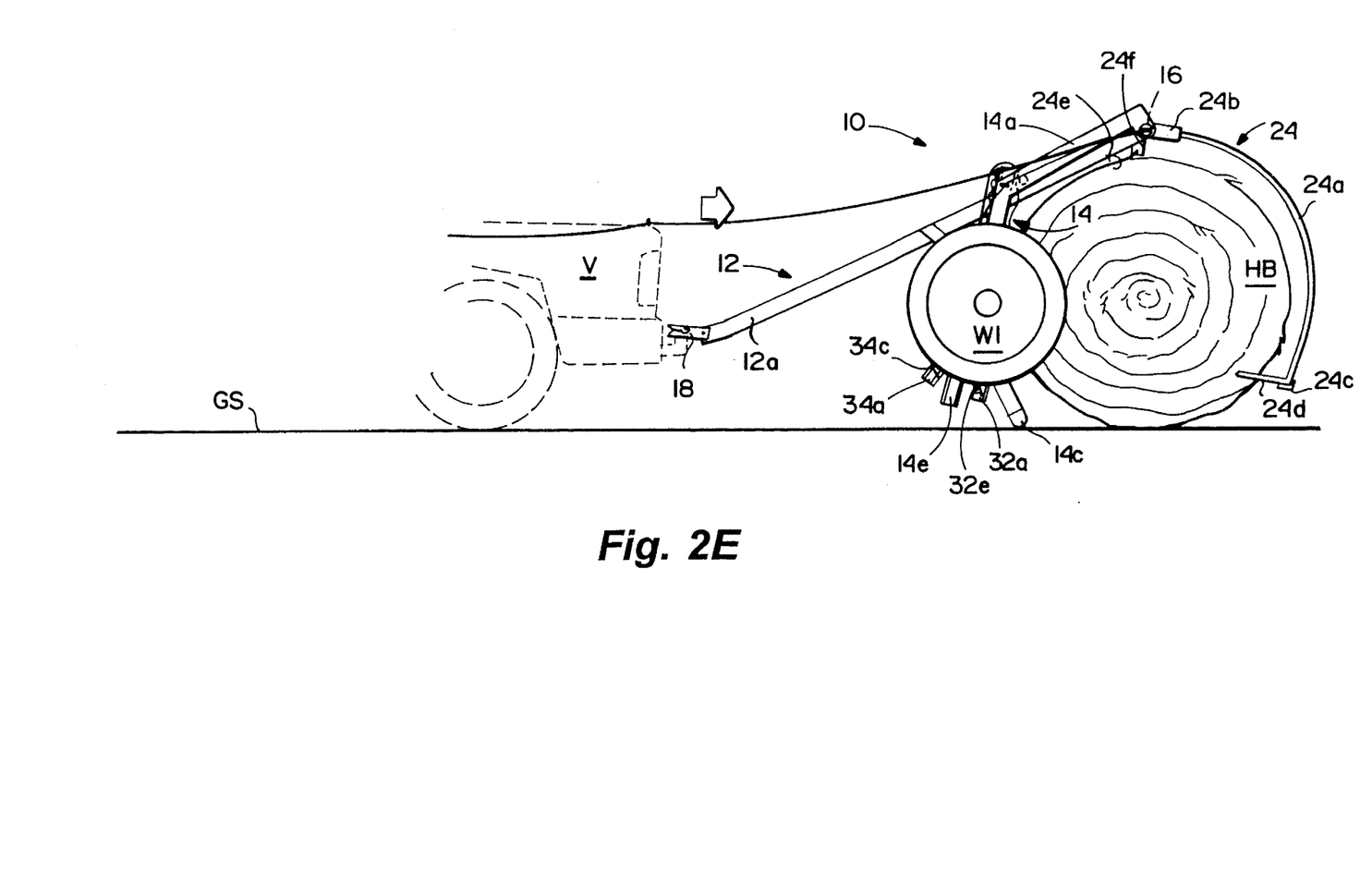

As shown in FIG. 2E, at this stage of the loading operation, the hay bale HB will press against the actuator arm 32d of the actuator arm assembly 32 thereby causing the actuator arm 32 to be moved pivotally into its lowered position. However, since the latch 38a is engaged with the pawl 38b, the brake foot assembly 34 is prevented from moving out of its non-deployed position as shown.

Figure 2F:
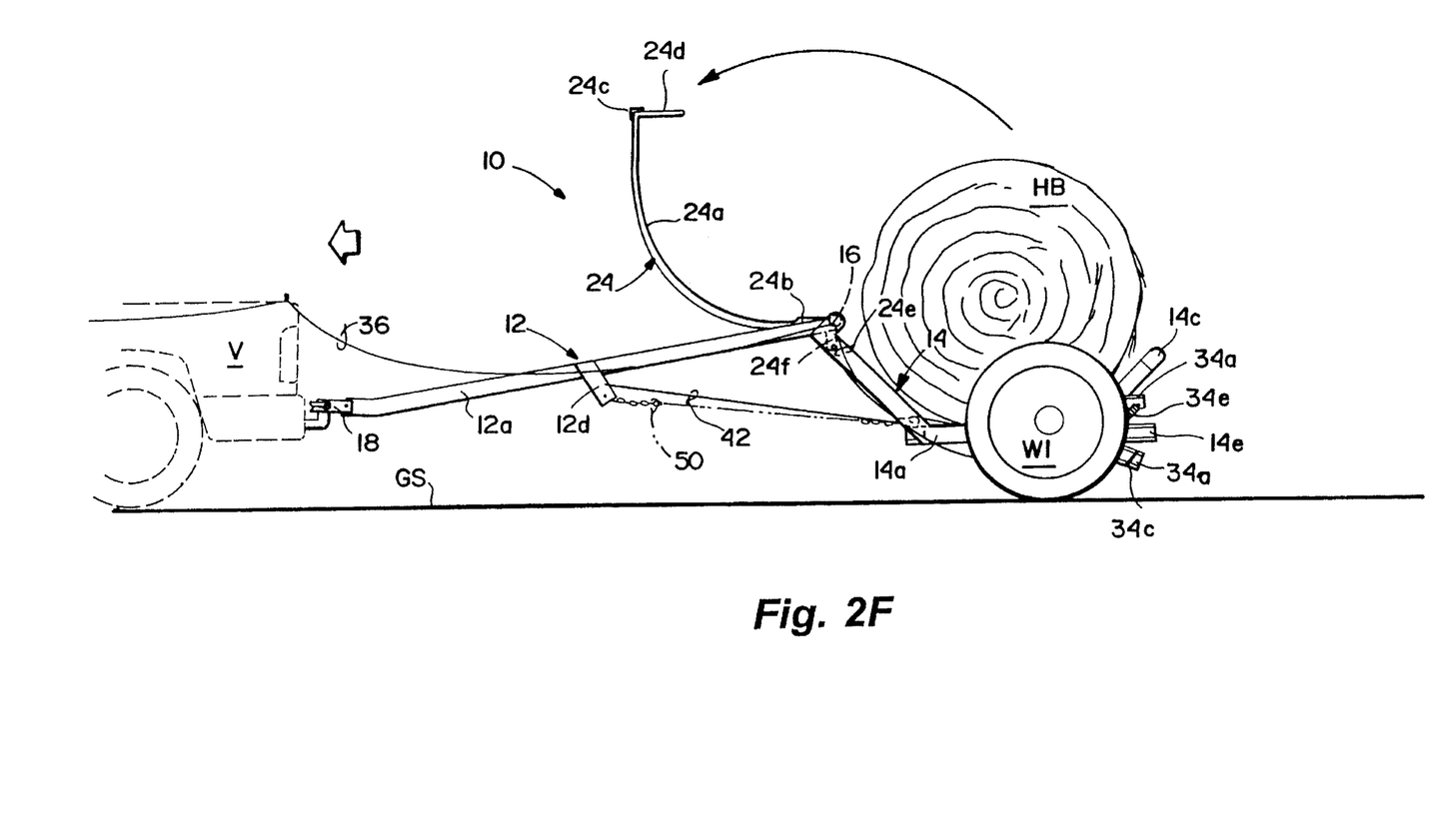
Figure 3F:
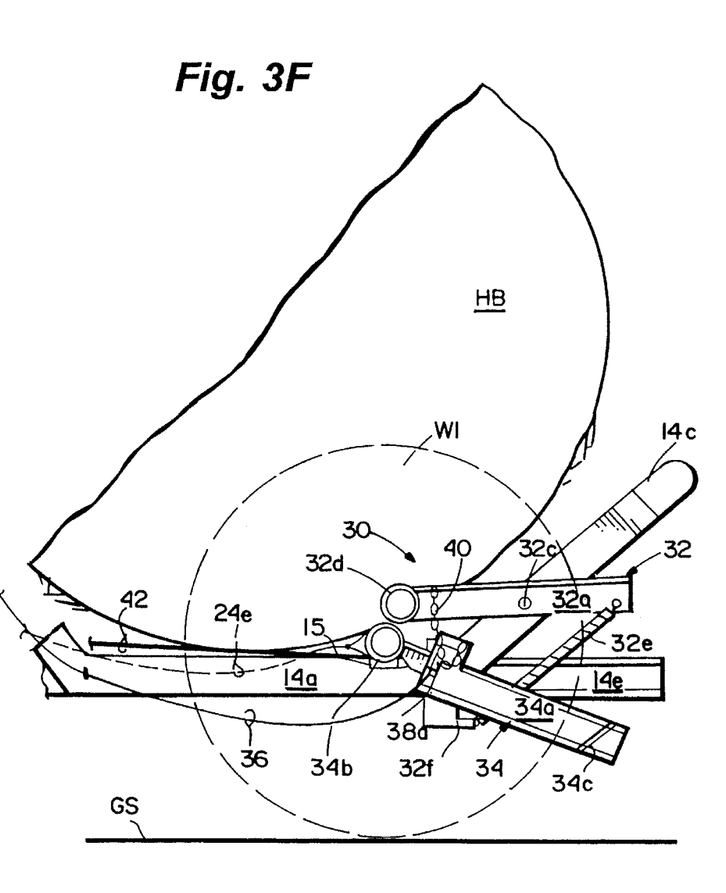

With the tines 24d of the fork assembly 24 engaged with the hay bale HB, the driver may then move the vehicle forwardly. The hay bale HB will thus be brought into cradled support within the cradle frame 14 as shown in FIGS. 2F and 3F. It will be understood that forward movement of the vehicle will cause the cradle frame 14 to pivot in an opposite direction about the point of contact between the cross-brace 14c until it no longer is capable of maintaining ground contact. At that time, ground contact will be transferred to the frame extension feet 14e, 14f about which the cradle frame 14 will then pivot thereby lowering the wheel assemblies W1, W2 closer to the ground surface.

Continued forward vehicle movement will cause the frame extension feet 14e, 14f to disengage from the ground surface thereby lowering the wheel assemblies into ground contact. However, since the brake foot 34a of the brake foot assembly 34 is maintained in its non-deployed condition as discussed previously, the trailer 10 is permitted to roll freely long the ground surface once the trailer has returned to its transport condition as shown in FIG. 2F. At this time, the weight of the hay bale will bear against the actuator cable 24d associated with the fork assembly 24 thereby responsively forcing 25 the fork assembly 24 to pivot forwardly into its rest position.

Unloading of the hay bale will essentially be practiced in a reverse manner to that described above. That is, when the vehicle operator is at the position where the hay bale is to be unloaded, the brake foot assembly 34 will be deployed thereby arresting rearward movement of the wheel assemblies W1, W2 across the ground surface GS. Thereafter, continued rearward movement of the trailer 10 will cause the hitch and cradle frames 12, 14, respectively, to articulate about the articulation axle 16 due to the cradle frame 14 pivoting about the point of ground engagement of the brake foot 34a, further rearward movement of the trailer 10 will then bring the frame extension feet 14e, 14f into engagement with the ground surface GS thereby raising the brake foot 14c out of ground engagement and allowing the actuator arm assembly 32 to pivotally raise the brake foot assembly once again into its non-deployed condition. At this stage, the weight of the hay bale HB will typically allow it to roll freely out of the cradle frame 14.

It will, of course, be understood that although the trailer 10 according to this invention has been described above with reference to the loading/unloading/transport of cylindrical hay bales, other bulk commodities may also satisfactorily be loaded, for example, large containers, cotton bales, grain sacks, drums and the like. The trailer could likewise be fitted with an appropriately sized rigid box in the cradle portion so as to make the trailer suitable for transporting and unloading loose materials, such as sand, soil, gravel, consumer waste, and the like. Furthermore, since the trailer of this invention may be provided with a mechanical brake foot assembly, it is particularly well suited for use on icy road conditions.

Therefore, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A self-loading trailer comprising:

a forward hitch frame and a rearward cradle frame coupled to one another to allow for relative articulation about an articulation axis; and wheel assemblies journally coupled to said cradle frame to support said trailer for rolling movement across a ground surface, wherein said cradle frame includes a rearward cross-brace and at least one frame extension foot extending rearwardly of said cradle frame and positioned below said cross-brace when said trailer is configured for rolling movement across the ground surface, and wherein said at least one frame extension foot is engageable with the ground surface in advance of said cross-brace during a loading operation in response to rearward trailer movement to cause said cradle frame to pivot about said ground-engaged frame extension foot and thereby lift the wheel assemblies out of ground engagement, and wherein continued pivotal movement of said cradle frame about said ground-engaged frame extension foot subsequently causes said rearward cross-brace to become engaged with the ground surface, such ground engagement of said rearward cross-brace thereby causing said frame extension foot to become disengaged with, and said wheel assemblies to be further incrementally lifted above, the ground surface.

2. The trailer as in claim 1, further comprising a brake assembly which includes a brake foot assembly pivotally movable relative to said cradle frame between (a) a non-deployed position wherein the trailer is allowed to roll over the ground surface, and (b) a deployed position wherein the brake foot assembly is engaged with the ground surface and thereby arrests rearward movement of said cradle frame over the ground surface.

3. The trailer as in claim 2, wherein said brake assembly further includes an actuator arm assembly operatively connected to said brake foot assembly for returning said brake foot assembly to said non-deployed position from said deployed position thereof.

4. The trailer as in claim 2, wherein said wheel assemblies include a rolling axle transversely journalled to said cradle frame, and wherein said brake foot assembly is coaxially coupled to said rolling axle for pivotal movements thereabout between said non-deployed and deployed positions.

5. The trailer as in claim 4, wherein said brake foot assembly further includes an actuator arm assembly operatively connected to said brake foot assembly for returning said brake foot assembly to said non-deployed position from said deployed position thereof.

6. The trailer as in claim 3, wherein said actuator arm assembly is connected to said cradle frame for pivotal movements between raised and lowered positions.

7. The trailer as in claim 6, wherein said brake foot assembly includes a flexible linkage member interconnecting said actuator arm assembly and said brake foot assembly, said flexible linkage member causing said brake foot assembly to be moved pivotally from said deployed position and into said non-deployed position in response to said actuator arm assembly moving pivotally from said lowered position and into said raised position, respectively.

8. The trailer as in claim 7, wherein said actuator arm assembly includes a spring for biasing said actuator arm into said raised position thereof.

9. The trailer as in claim 6, wherein said actuator arm assembly includes a spring for biasing said actuator arm into said raised position thereof.

10. The trailer as in claim 9, wherein said actuator arm assembly includes a transversely oriented actuator arm against which a load supported by said cradle frame bears to move said actuator arm assembly into said lowered position from said raised position thereof.

11. The trailer as in claim 6, wherein said actuator arm assembly includes a flexible arresting cable which interconnects said actuator arm assembly and said forward hitch frame, said arresting cable preventing pivotal movement of said actuator arm assembly from said lowered position and into said raised position thereof when said hitch and cradle frames are in a non-articulated transport condition.

12. The trailer as in claim 2, wherein said brake assembly includes a latch and pawl assembly for releasably maintaining said brake foot assembly in said non-deployed position thereof.

13. The trailer as in claim 12, further comprising a manually operable control cable connected to said latch and pawl assembly which when operated releases said latch and pawl assembly and thereby allows said brake foot assembly to move into said deployed position thereof.

14. A self-loading trailer comprising:

a forward hitch frame and a rearward cradle frame coupled to one another to allow for relative articulation about an articulation axis;

wheel assemblies journally coupled to said cradle frame to support said trailer for rolling movement across ground surface; and a brake foot assembly connected to said cradle frame and having a ground-engageable brake arm which is pivotal between (a) a non-deployed position wherein said brake arm is spaced above the ground surface to permit said trailer to roll thereacross, and (b) a deployed condition wherein said brake arm is engaged with the ground surface to thereby arrest rearward movement of the cradle frame across the ground surface to thereby cause said forward hitch and cradle frames to articulate relative to one another about said articulation axis, wherein said wheel assemblies include a rolling axle transversely journalled to said cradle frame, and wherein said brake foot assembly is coaxially coupled to said rolling axle for pivotal movements thereabout between said non-deployed and deployed positions.

15. A self-loading trailer comprising:

a forward hitch frame and a rearward cradle frame coupled to one another to allow for relative articulation about an articulation axis;

wheel assemblies journally coupled to said cradle frame to support said trailer for rolling movement across ground surface; and a brake foot assembly connected to said cradle frame and having a ground-engageable brake arm which is pivotal between (a) a non-deployed position wherein said brake arm is spaced above the ground surface to permit said trailer to roll thereacross, and (b) a deployed condition wherein said brake arm is engaged with the ground surface to thereby arrest rearward movement of the cradle frame across the ground surface to thereby cause said forward hitch and cradle frames to articulate relative to one another about said articulation axis, wherein said brake foot assembly further includes an actuator arm assembly operatively connected to said brake foot assembly for pivotally returning said brake foot assembly to said non-deployed position from said deployed position thereof.

16. The trailer as in claim 14 or 15, further including at least one flexible limiting member interconnecting said hitch and cradle frames and positioned below said articulation axis, for transferring load weight supported by said cradle frame to said hitch frame.

17. The trailer as in claim 14, wherein said brake foot assembly further includes an actuator arm assembly operatively connected to said brake foot assembly for pivotally returning said brake foot assembly to said non-deployed position from said deployed position thereof.

18. The trailer as in claim 15, wherein said actuator arm assembly is connected to said cradle frame for pivotal movements between raised and lowered positions.

19. The trailer as in claim 18, wherein said brake assembly includes a flexible linkage member interconnecting said actuator arm assembly and said brake foot assembly, said flexible linkage member causing said brake foot assembly to be moved pivotally from said deployed position and into said non-deployed position in response to said actuator arm assembly moving pivotally from said lowered position and into said raised position, respectively.

20. The trailer as in claim 19, wherein said actuator arm assembly includes a spring for biasing said actuator arm into said raised position thereof.

21. The trailer as in claim 15, wherein said cradle frame includes a rearward cross-brace and at least one frame extension foot extending rearwardly of said cradle frame and positioned below said cross-brace when said trailer is configured for rolling movement across the ground surface, and wherein said at least one frame extension foot is engageable with the ground surface in advance of said cross-brace during a loading operation in response to rearward trailer movement to cause said cradle frame to pivot about said ground-engaged frame extension foot and thereby lift the wheel assemblies out of ground engagement, and wherein continued pivotal movement of said cradle frame about said ground-engaged frame extension foot subsequently causes said rearward cross-brace to become engaged with the ground surface, such ground engagement of said rearward cross-brace thereby causing said frame extension foot to become disengaged with, and said wheel assemblies to be further incrementally lifted above, the ground surface.

22. The trailer as in claim 21, wherein said pivotal movement of said cradle frame about said ground-engaged frame extension foot causes said brake foot assembly to be disengaged from said ground surface, and wherein said actuator arm assembly is pivotally coupled to said cradle frame for movements between raised and lowered positions, said actuator arm assembly being moved into said raised position in response to said ground disengagement of said brake foot assembly thereby causing said brake foot assembly to be moved into said non-deployed position from said deployed position thereof.

23. The trailer as in claim 22, wherein said actuator arm assembly includes a spring for biasing said actuator assembly into said raised position thereof.

24. The trailer as in claim 23, wherein said brake assembly includes a flexible linkage member interconnecting said actuator arm assembly and said brake foot assembly, said flexible linkage member causing said brake foot assembly to be moved pivotally from said deployed position and into said non-deployed position in response to said actuator arm assembly moving pivotally from said lowered position and into said raised position, respectively.

25. The trailer as in claim 1 or 14 or 15, further comprising a self-actuating fork assembly mounted to said cradle frame for pivotal movements between a rest position wherein said fork assembly is positioned forwardly of said trailer and an engaged position wherein said fork assembly is positioned rearwardly of said trailer.

26. The trailer as in claim 25, wherein said fork assembly includes a curved fork arm having a proximal end pivotally connected to said cradle frame, and a distal end which includes a number of tines.

27. The trailer as in claim 26, wherein said fork assembly includes a flexible actuator cable which moves said fork assembly from said engaged position and into said rest position in response to a load being supported by said cradle frame.

28. The trailer as in claim 27, wherein said actuator cable is connected at one end to said proximal end of said fork arm and at an opposite end to said cradle frame so that said actuator cable extends across a forward portion of said cradle frame.

29. The trailer as in claim 28, wherein said fork arm includes a support flange assembly which is coaxially mounted with respect to said articulation axis.

30. A self-loading trailer comprising:
- a forward hitch frame and a rearward cradle frame coupled to one another to allow for relative articulation about an articulation axis;
- wheel assemblies journally coupled to said cradle frame to support said trailer for rolling movement across ground surface;
- a brake assembly for arresting rearward movement of the cradle frame across the ground surface to thereby cause said forward hitch and cradle frames to articulate relative to one another about said articulation axis; and
- a flexible limiting member interconnecting said hitch and cradle frames and positioned below said articulation axis, for transferring load weight supported by said cradle frame to said hitch frame.

31. A self-loading trailer comprising:
- a forward hitch frame and a rearward cradle frame coupled to one another to allow for relative articulation about an articulation axis;
- wheel assemblies journally coupled to said cradle frame to support said trailer for rolling movement across ground surface;
- a brake assembly for arresting rearward movement of the cradle frame across the ground surface to thereby cause said forward hitch and cradle frames to articulate relative to one another about said articulation axis; and
- a self-actuating fork assembly mounted to said cradle frame for pivotal movements between a rest position wherein said fork assembly is positioned forwardly of said trailer, and an engaged position wherein said fork assembly is positioned rearwardly of said trailer, wherein
- said fork assembly includes a flexible actuator cable positioned so as to contact a load supported in said cradle frame, said flexible actuator cable responsively moving said fork assembly from said engaged position and into said rest position upon being contacted by the load supported by said cradle frame.

32. The trailer as in claim 30 or 31, wherein said brake assembly includes a brake foot assembly connected to said cradle frame, said brake foot assembly having a ground-engageable brake foot which is pivotal between (a) a non-deployed position wherein said brake foot is spaced above the ground surface to permit said trailer to roll thereacross, and (b) a deployed condition wherein said brake foot is engaged with the ground surface to thereby arrest rearward movement of the cradle frame across the ground surface to thereby cause said forward hitch frame and rearward cradle frame to articulate relative to one another about said articulation axis.

33. The trailer as in claim 30 or 31, wherein said cradle frame includes:
- a rearward cross-brace and at least one frame extension foot extending rearwardly of said cradle frame and positioned below said cross-brace when said trailer is configured for rolling movement across the ground surface, and wherein
- said at least one frame extension foot is engageable with the ground surface in advance of said cross-brace during a loading operation in response to rearward trailer movement to cause said cradle frame to pivot about said ground-engaged frame extension foot and thereby lift the wheel assemblies out of ground engagement, and wherein
- continued pivotal movement of said cradle frame about said ground-engaged frame extension foot subsequently causes said rearward cross-brace to become engaged with the ground surface, such ground engagement of said rearward cross-brace thereby causing said frame extension foot to become disengaged with, and said wheel assemblies to be further incrementally lifted above, the ground surface.

* * * * *